US011008506B2

(12) United States Patent
Nguyen et al.

(10) Patent No.: US 11,008,506 B2
(45) Date of Patent: May 18, 2021

(54) MICRO-PROPPANT FRACTURING FLUID AND SLURRY CONCENTRATE COMPOSITIONS

(71) Applicant: HALLIBURTON ENERGY SERVICES, INC., Houston, TX (US)

(72) Inventors: Philip D. Nguyen, Houston, TX (US); Janette Cortez, Porter, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 493 days.

(21) Appl. No.: 15/754,928

(22) PCT Filed: Oct. 15, 2015

(86) PCT No.: PCT/US2015/055774
§ 371 (c)(1),
(2) Date: Feb. 23, 2018

(87) PCT Pub. No.: WO2017/065779
PCT Pub. Date: Apr. 20, 2017

(65) Prior Publication Data
US 2020/0239764 A1    Jul. 30, 2020

(51) Int. Cl.
*C09K 8/80* (2006.01)
*C09K 8/66* (2006.01)
*E21B 43/267* (2006.01)

(52) U.S. Cl.
CPC ............. *C09K 8/805* (2013.01); *C09K 8/66* (2013.01); *E21B 43/267* (2013.01)

(58) Field of Classification Search
None
See application file for complete search history.

(56) References Cited

U.S. PATENT DOCUMENTS

| 5,095,987 A | 3/1992 | Weaver et al. |
| 5,582,250 A * | 12/1996 | Constien ............ C09K 8/62 166/280.1 |
| 5,799,734 A | 9/1998 | Norman et al. |
| 6,742,590 B1 | 6/2004 | Nguyen |
| 7,178,596 B2 | 2/2007 | Blauch et al. |

(Continued)

FOREIGN PATENT DOCUMENTS

| WO | 2004083600 A1 | 9/2004 |
| WO | 2015030805 A1 | 3/2015 |

(Continued)

OTHER PUBLICATIONS

International Search Report and Written Opinion; PCT Application No. PCT/US2015/055774; dated May 13, 2016.

*Primary Examiner* — John J Figueroa
(74) *Attorney, Agent, or Firm* — Polsinelli PC (57) ABSTRACT

Fracturing fluids and liquid concentrate proppant slurry compositions comprising high-density micro-proppants and low-density particulates in a single treatment fluid. The low-density particulates enhance the suspension of the high-density particulates resulting in improved vertical distribution and longitudinal transport and coverage in the complex fracture network. Methods of hydraulic fracturing using the disclosed fracturing fluids and liquid concentrate proppant slurries as well as methods of preparing liquid concentrate proppant slurries with improved storage properties, are provided.

12 Claims, 2 Drawing Sheets

(56) References Cited

U.S. PATENT DOCUMENTS

| | | |
|---|---|---|
| 7,261,157 B2 | 8/2007 | Nguyen et al. |
| 7,708,069 B2 | 5/2010 | Watters et al. |
| 8,960,284 B2 | 2/2015 | Nguyen et al. |
| 8,985,213 B2 | 3/2015 | Saini et al. |
| 2004/0040708 A1* | 3/2004 | Stephenson ............ E21B 43/267 166/280.1 |
| 2005/0028979 A1* | 2/2005 | Brannon .................. C09K 8/62 166/280.2 |
| 2006/0175059 A1* | 8/2006 | Sinclair .................. C09K 8/805 166/283 |
| 2007/0209795 A1* | 9/2007 | Gupta ...................... C09K 8/80 166/278 |
| 2011/0120719 A1* | 5/2011 | Soane ..................... C09K 8/805 166/308.1 |
| 2014/0060827 A1 | 3/2014 | Nguyen et al. |

FOREIGN PATENT DOCUMENTS

| | | |
|---|---|---|
| WO | 2015038153 A1 | 3/2015 |
| WO | 2015041690 A1 | 3/2015 |
| WO | 2015126371 A1 | 8/2015 |

\* cited by examiner

MICRO-PROPPANT FRACTURING FLUID AND SLURRY CONCENTRATE COMPOSITIONS

CROSS-REFERENCE TO RELATED APPLICATIONS

This application is a national stage entry of PCT/US2015/055774 filed Oct. 15, 2015, said application is expressly incorporated herein in its entirety.

FIELD

The present disclosure relates to fracturing operations in subterranean wellbores. In particular, the present disclosure relates to fluids used in hydraulic fracturing operations.

BACKGROUND

Wellbores are drilled into the earth for a variety of purposes including tapping into hydrocarbon bearing formations to extract the hydrocarbons for use as fuel, lubricants, chemical production, and other purposes. Hydrocarbon producing wells can be stimulated using fracturing treatments. In a typical hydraulic fracturing treatment, a fracturing fluid is pumped through a wellbore and into a subterranean formation producing zone at a rate and pressure such that one or more fractures are formed or extended into the zone.

Hydraulic fracturing treatments may produce primary fractures in the near field around the well bore, as well as induced, dendritic fractures in the far field extending from the primary fractures. These induced, dendritic fractures are generally formed at the tip and edges of the primary fractures, and extend outwardly in a branching tree like manner from the primary fractures, creating a complex fracture network. The complex fracture network encompasses the primary fracture and any and all branching fractures (e.g., secondary branch fractures, tertiary branch fractures, etc.), regardless of their size, man-made or otherwise, within a subterranean formation that are in fluid communication with the wellbore. Because secondary dendritic fractures can extend transversely to the trajectory of the primary fractures, they reach and link natural fractures both in and adjacent to the trajectory of the primary fractures. As such, secondary fractures reach a larger portion of the naturally occurring fracture network, and link the natural fractures back to the primary fractures and the wellbore. Accordingly, communication between the primary fracture and the remainder of the corresponding complex fracture network may be an important factor in maximizing production from the formation.

The fracturing fluid may also function as a carrier fluid that transports solids to a target area. For example, particulate solids, also known as "proppant particulates," "proppants," or "particulates," may be suspended in a portion of the fracturing fluid and transported to a fracture. The suspended particulates are deposited in the fractures so as to prevent the fractures from fully closing once the hydraulic pressure is removed. By keeping the fractures from fully closing, the proppant particulates aid in forming conductive channels through which produced hydrocarbons can readily flow. Accordingly, proppant particulates hold the complex fracture network open, thereby maintaining the ability for hydrocarbons to flow through the complex fracture network to ultimately be produced at the surface.

BRIEF DESCRIPTION OF THE DRAWINGS

In order to describe the manner in which the advantages and features of the disclosure can be obtained, reference is made to embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

In the following discussion and in the claims, the terms "including" and "comprising" are used in an open-ended fashion, and thus should be interpreted to mean "including, but not limited to . . . ". Reference to up or down will be made for purposes of description with "upper," or "uphole" meaning toward the surface of the wellbore and with "lower," or "downhole" meaning toward the terminal end of the well, regardless of the wellbore orientation. The various characteristics described in more detail below, will be readily apparent to those skilled in the art with the aid of this disclosure upon reading the following detailed description, and by referring to the accompanying drawings.

The present disclosure generally relates to fracturing fluid compositions that include both high-density particulates and low-density particulates in a single treatment fluid. The low-density particulates enhance the suspension of the high-density particulates resulting in improved vertical distribution and longitudinal transport and coverage in the complex fracture network.

Additionally, the present disclosure relates to liquid concentrate micro-proppant slurry compositions that may be used to prepare fracturing fluids. The micro-proppant slurry compositions include both high-density particulates and low-density particulates. The low-density particulates in the micro-proppant slurry composition enhance the long-term suspension of the high-density micro-proppant particulates as well as the long-term storage of the slurry composition. Additionally, the low-density particulates enhance the longitudinal transport of the high-density micro-proppant particulates during hydraulic fracturing treatments.

The present disclosure also relates to methods of fracturing subterranean formations using the fracturing fluid compositions and liquid concentrate micro-proppant slurry compositions disclosed herein. The present disclosure is also directed to methods of preparing the liquid concentrate micro-proppant slurry compositions as well as to methods of preparing fracturing fluids using the liquid concentrate micro-proppant slurry compositions.

Generally, the fracturing fluid compositions, disclosed herein, as well as fracture fluids prepared using the presently disclosed liquid concentrate micro-proppant slurry compositions, are introduced downhole into a fracture within a subterranean formation during a fracturing operation. The fracturing fluids and liquid concentrate proppant slurry compositions and methods, disclosed herein, may be used during hydraulic fracturing operations to prop primary fractures as well as the dendritic fractures (e.g., secondary branch fractures, tertiary branch fractures, etc.) that form part of the complex fracture network.

Figure 1:
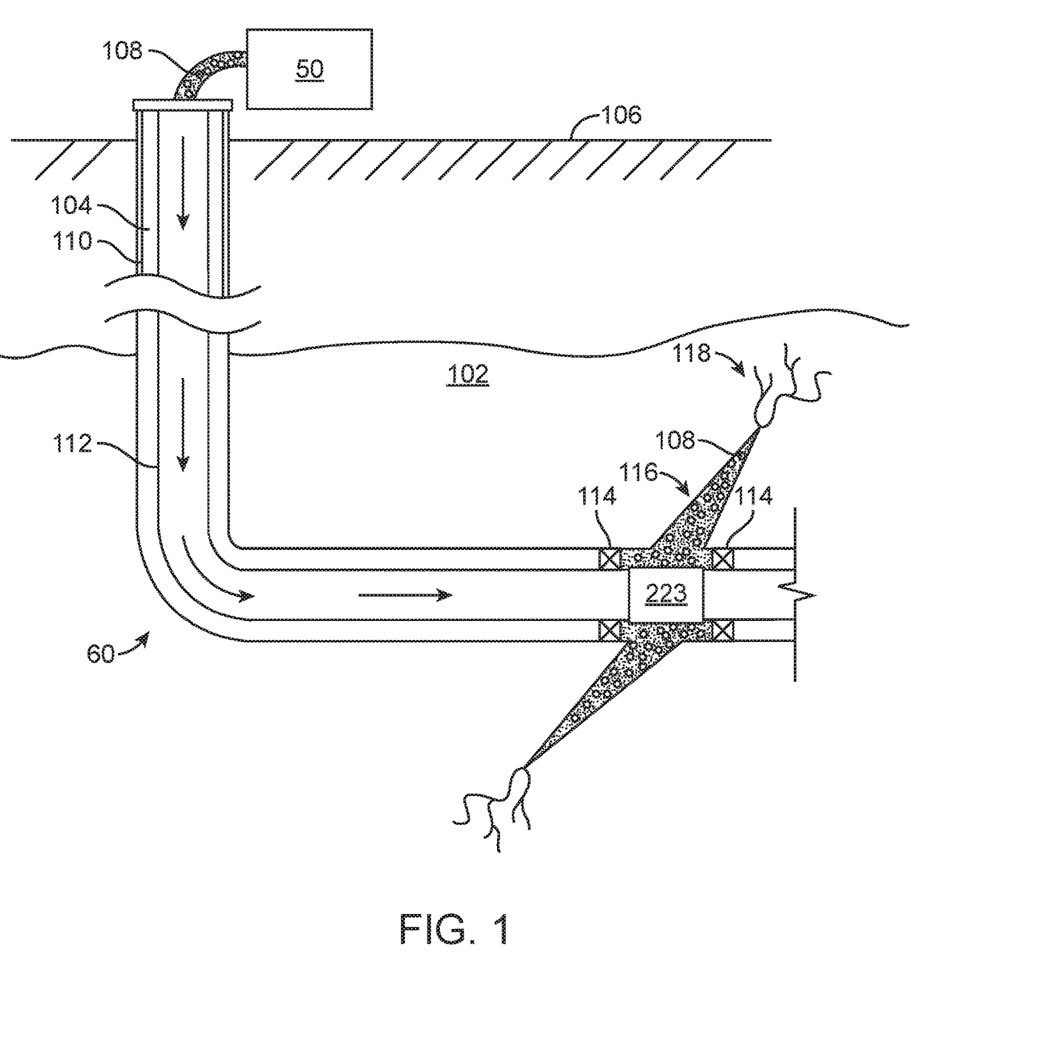
FIG. 1 is a schematic view of a wellbore operating environment in which a fracturing fluid or liquid concentrate proppant slurry may be deployed, according to an exemplary embodiment.

FIG. 1 illustrates a schematic view of an embodiment of a wellbore operating environment in which a fracturing fluid or liquid concentrate proppant slurry may be deployed. As depicted, wellbore 104 of well 60 extends through various earth strata including a subterranean zone of interest 102. FIG. 1 shows the well 60 during a fracture treatment of zone of interest 102. The subterranean zone 102 can include one or more subterranean formations or a portion of a subterranean formation.

The fracturing fluid 108 is applied to the subterranean zone 102 through wellbore 104 which extends from a terranean surface 106. Although the wellbore 104 in FIG. 1 is shown as vertical deviating to horizontal, the wellbore 104 may include horizontal, vertical, slant, curved, and other types of wellbore geometries and orientations without departing from the spirit and scope of this disclosure. Additionally, the fracturing treatment may be applied to a subterranean zone surrounding any portion of the wellbore 104 without departing from the spirit and scope of this disclosure.

The wellbore 104 can include a casing 110 that is cemented or otherwise secured to the wellbore wall. However, the wellbore 104 can be uncased (e.g., open hole) or include uncased sections without departing from the spirit and scope of the present disclosure. Perforations can be formed in the casing 110 to allow fracturing fluids and/or other materials to flow into the subterranean zone 102. In cased wells, perforations can be formed using shape charges, a perforating gun, hydrojetting and/or other tools.

The well 60 is depicted with a work string 112 depending from the terranean surface 106 into the wellbore 104. A pump and blender system 50 is coupled to the work string 112 to communicate fracturing fluid 108 into the wellbore 104. The pump and blender system 50 resides at the terranean surface 106 at or near well 60. In some cases, the pump and blender system 50 combines a proppant source, such as a liquid concentrate proppant slurry, with a fluid source and possibly other components to form fracturing fluid 108, as shown in more detail in FIG. 2, discussed below. The resulting fracturing fluid 108 may be pumped down the well 60 under pressure to fracture stimulate the subterranean zone 102 thereby enhancing production of hydrocarbons from the subterranean zone 102.

Figure 2:
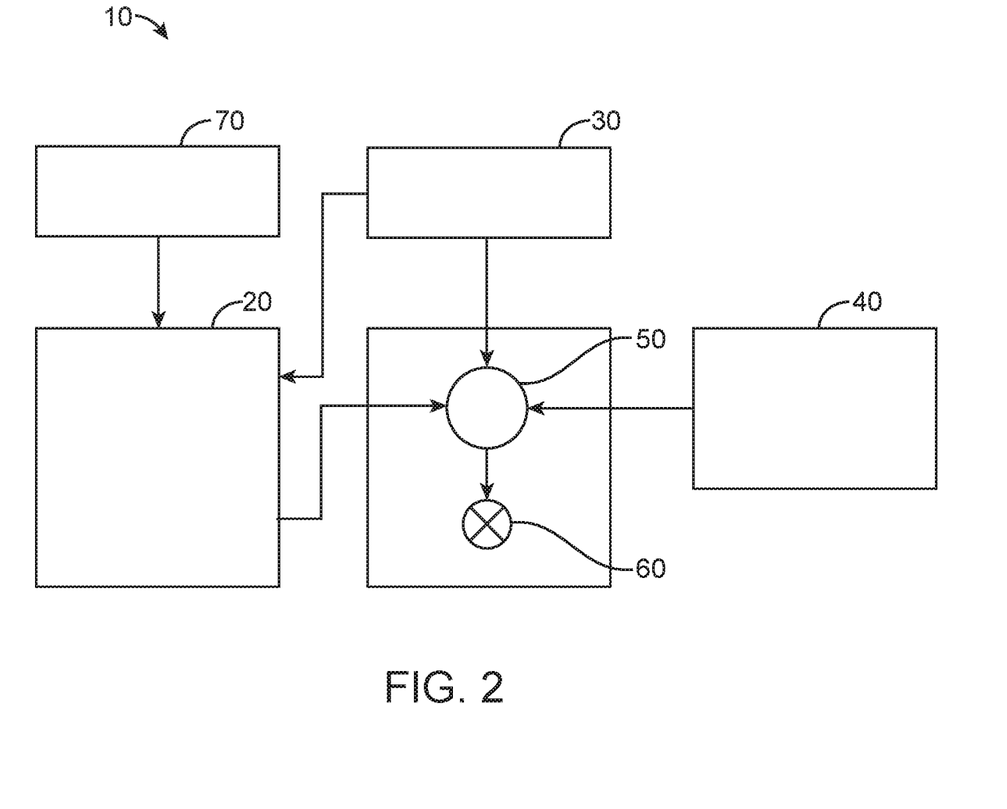
FIG. 2 is a diagram illustrating an example of a fracturing system that may be used in accordance with certain embodiments of the present disclosure.

With reference to FIG. 2, the disclosed methods and compositions may directly or indirectly affect one or more components or pieces of equipment associated with an exemplary fracturing system 10, according to one or more embodiments. The system 10 includes a fracturing fluid producing apparatus 20, a fluid source 30, a proppant source 40, and a pump and blender system 50 and resides at the surface at a well site where a well 60 is located (shown in FIG. 1). In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may include water, a hydrocarbon fluid, a polymer gel, foam, air, wet gases and/or other fluids.

The proppant source 40 can include a proppant for combination with the fracturing fluid, including the high-density proppant particulates and/or low-density suspension agent particulates discussed herein. The system may also include additive source 70 that provides one or more additives (e.g., gelling agents, weighting agents, suspension agent particulates and/or tackifying agent disclosed herein and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70 to form fracturing fluid 108 shown in FIG. 1. The resulting mixture may be pumped down the well 60 under a pressure sufficient to create or enhance one or more fractures in a subterranean zone shown in FIG. 1, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to be sourced from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Referring back to FIG. 1, the work string 112 may include coiled tubing, jointed pipe, and/or other structures that communicate fluid through the wellbore 104. The work string 112 can include flow control devices 223 (e.g., bypass valves, ports, and/or other tools or well devices) that control a flow of fluid from the interior of the work string 112 into the subterranean zone 102. For example, the work string 112 may include ports adjacent the wellbore wall to communicate the fracturing fluid 108 directly into the subterranean zone 102, and/or the work string 112 may include ports that are spaced apart from the wellbore wall to communicate the fracturing fluid 108 into an annulus in the wellbore between the work string 112 and the wellbore wall.

The work string 112 and/or the wellbore 104 may include one or more sets of packers 114 that seal the annulus between the work string 112 and wellbore 104 to define an interval of the wellbore 104 into which the fracturing fluid 108 will be pumped. FIG. 1 depicts two packers 114, one defining an uphole boundary of the interval and one defining the downhole end of the interval.

As depicted, the fracturing treatment of subterranean zone 102 produced both a primary fracture 116 in the near field as well as secondary, induced, dendritic fractures 118 in the far field (dendritic fractures 118 can also be referred to as microfractures). The secondary fractures 118 have propagated from or near the ends and edges of the primary fracture 116.

The fracturing treatment may be performed in one or more stages, where different amounts, sizes, and/or concentrations of proppant or, in some stages, no proppant is provided into the fractures 116, 118. For example, in certain instances, the fractures 116, 118 can be initiated with a fracturing fluid containing little or no proppant, then subsequent stages can provide the proppant to the fractures 116, 118 in a manner that fills and props open both the secondary fractures 118 and primary fractures 116. Given the small size of the dendritic, secondary fractures 118, one or more of the stages may introduce a micro-proppant such that the particle size is less than the transverse dimension of the fracture when held open under fracturing pressure. In some cases, the micro-proppant may be smaller than 100 mesh (149 µm), and in certain instances equal to or smaller than 200 mesh (74 µm), 230 mesh (63 µm) or even 325 mesh (44 µm), or smaller. The stages can be arranged to provide proppant such that the secondary fractures 118 are propped by the micro-proppant. The stages can also be arranged to provide the proppant and micro-proppant intermixed and/or some stages can provide substantially just micro-proppant and other stages can provide just larger proppant.

According to the present disclosure, a fracturing fluid composition is provided that includes an aqueous-based carrier fluid, high-density proppant particulates, and low-density suspension agent particulates. The presence of high-density particulates and low-density particulates in a single treatment fluid improves the vertical distribution and longitudinal transport and coverage of the high-density proppant particulates in the complex fracture network. More specifically, the low-density suspension agent particulates enhances the suspension of the high-density proppant particulates, resulting in neutral buoyancy of the high-density proppant particulates in the fracturing fluid and improved transport of the high-density proppant particulates in the complex fracture network, including both the near-wellbore and far-field regions. In at least some instances, the neutral buoyancy and improved transport of the high-density proppant particulates results from attachment of the low-density particulates to the surface of the high-density proppant particulates. In such cases, attachment of the low-density particulates to the surfaces of high-density particulates can cause the high-density particulates to become neutrally buoyant or suspended in the carrier fluid, even without the use of a viscosifying agent.

According to at least one aspect of the present disclosure, a low concentration of tackifying agent can be added to the fracturing fluid in order to promote the adhesion of the low-density particulates to the high-density particulates. The low-level of adhesion provided by the tackifying agent may also help to distribute the low-density particulates and the high-density particulates homogeneously within the fracturing fluid. According to the present disclosure, the tackifying agent may be present in the fracturing fluid in sufficient concentration to cause the high-density particulates to be neutrally buoyant or suspended in the fracturing fluid. Suitable tackifying agents may include, but are not limited to, non-aqueous tackifying agents, aqueous tackifying agents, silyl-modified polyamide, zeta potential modifying agents, the reaction product of an amine and a phosphate ester, any derivative thereof, and any combination thereof. As used herein, the term "tacky," in all of its forms, generally refers to a substance having a nature such that it is (or may be activated to become) somewhat sticky to the touch.

In some cases, the low-density particulates may be caused to attach to the high-density particulates as a result of a coating on the high-density particulates that exhibits an affinity for the low-density particulates. In other cases, the low-density particulates may attach to the high-density particulates as a result of electrostatic attractions or interactions between the low-density particulates and the high-density particulates.

According to at least one aspect of the present disclosure, the low-density suspension agent particulates are present in the fracturing fluid in sufficient concentration to cause the high-density particulates to be neutrally buoyant in the fracturing fluid. As used herein, the term "neutrally buoyant," generally refers to a particulate being capable of substantially maintaining suspension in a fluid in the absence of mechanical agitation or perturbation.

According to at least one aspect of the present disclosure, the fracturing fluid contains a sufficient number of low-density suspension agent particulates to cause the high-density particulates to be neutrally buoyant in the fracturing fluid. In some cases, the ratio of low-density particulates to high-density particulates in the fracturing fluid is between about 0.1:1 and about 10:1, by weight. In other cases, the ratio of low-density particulates to high-density particulates in the fracturing fluid is between about 1:3 and about 3:1, by weight.

The high-density and low-density particulates suitable for use in the compositions and methods of the present disclosure may be of any size and shape combination known in the art as suitable for use in a fracturing operation. The present disclosure provides for both high-density particulates and low-density particulates. High-density particulates are characterized by an average density of 1.50 $g/cm^3$ or higher. In some cases, the high-density particulates may be characterized by an average density of 2.40 $g/cm^3$ or greater. In other cases, the high-density particulates may be characterized by an average density of 2.60 $g/cm^3$ or greater. In other cases, the high-density particulates may be characterized by an average density between about 2.30 $g/cm^3$ and about 2.70 $g/cm^3$. In other cases, the average density of the high-density particulates is between about 2.0 $g/cm^3$ and about 3.0 $g/cm^3$.

Low-density particulates are characterized by an average density of less than 1.50 $g/cm^3$. In some instances, the low-density proppant particulates are characterized by an average density of 1.25 $g/cm^3$ or less. In other instances, the low-density proppant particulates are characterized by an average density of 1.00 $g/cm^3$ or less. In still other cases, the low-density particulates are characterized by an average density of 0.85 $g/cm^3$ or less. In still other cases, the low-density particulates are characterized by an average density of 0.75 $g/cm^3$ or less. In still other cases, the average density of the low-density particulates is between about 0.37 $g/cm^3$ and about 0.63 $g/cm^3$. In some cases, the high-density and/or low-density particulates may have a fairly narrow density distribution. In other cases, the high-density and/or low-density particulates may have a fairly wide density distribution.

The high-density and low-density particulates suitable for use in the compositions and methods of the present disclosure may be any material suitable for use in subterranean operations. Suitable materials for the high-density particulates and/or low-density particulates include, but are not limited to sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, silica, alumina, fumed carbon, carbon black, graphite, mica, titanium dioxide, meta-silicate, calcium silicate, kaolin, talc, zirconia, boron, fly ash, hollow glass microspheres, ceramic microspheres, solid glass, and any combination thereof.

In some cases, the high-density particulates and low-density particulates can each be micro-proppants. Typical proppants used in hydraulic fracturing stimulation, in the range of 100 to 12 mesh (149-1680 μm) cannot invade the dendritic fractures, and therefore, will not prop or keep the dendritic fractures open when hydraulic pressure from the fracturing treatment is withdrawn. Therefore micro-proppants smaller than 100 mesh (149 μm), and in certain instances equal to or smaller than 200 mesh (74 μm), 230 mesh (63 μm) or even 325 mesh (44 μm) or smaller, are used to prop open these induced, dendritic fractures. In certain instances, the size of the micro-proppant can be selected in relation to the size of the dendritic fractures to be propped, such that the particle size is less than the transverse dimension of the dendritic fracture when held open under fracturing pressure.

In some cases, the high-density particulates can be ceramic micro-proppants. In some instances, the high-density particulates can be ceramic microspheres. In some cases, the high-density particulates may be Zeeospheres N-1000, or Zeeospheres N-1200, or a combination of Zeeospheres N-1000 and Zeeospheres N-1200 microspheres available from Zeeospheres™ Ceramics, LLC of Lockport, La., USA. In some cases, the median particle size of the high-density particulates is between about 25 μm and about 110 μm.

In some cases, the low-density particulates can be hollow glass particulates or hollow mineral oxide particulates. In some instances, the low-density particulates are hollow glass microspheres. In some cases, the low-density particulates are selected from the group consisting of 3M Glass Bubbles HGS2000, HGS3000, HGS4000, HGS5000, HGS6000, HGS8000X, HGS10000, HGS18000, HGS19000, and any combination thereof. In some instances, the median particle size of the low-density particulates is between about 10 μm and about 60 μm. In some cases, the crush strength of the low-density particulates is between about 4,000 psi and about 18,000 psi. In some cases, the low-density particulates, including hollow glass particulates and hollow glass microspheres, may be coated with a coating that increases the crush strength of the low-density particulates.

According to at least one aspect of the present disclosure, the fracturing fluid may further include a xanthan gel. The fracturing fluid may further include a friction reducing polymer comprising at least one monomeric unit selected from the group consisting of acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, a methacrylic acid, an acrylic acid ester, a methacrylic acid ester, and any combination thereof.

According to the present disclosure, a method of fracturing a subterranean formation that includes introducing the fracturing fluid, disclosed herein, into a subterranean formation, is provided.

According to the present disclosure, a liquid concentrate proppant slurry is provided that includes an aqueous-based carrier fluid, high-density particulates, and low-density particulates, wherein the low-density particulates are present in the liquid concentrate proppant slurry in sufficient concentration to cause the high-density particulates to be neutrally buoyant in the liquid concentrate proppant slurry. It has unexpectedly been found that the presence of low-density particulates in the liquid concentrate proppant slurry enhances the long-term suspension of the high-density particulates, even when the high-density particulates are micro-proppants, which are known to be prone to precipitation and settling. Therefore, the low-density particulates act as a suspension aid, ensuring long-term suspension and storage of the liquid concentrate proppant slurry. Further, the presence of both high-density particulates and low-density particulates in the same liquid concentrate proppant slurry provides improved storage characteristics for the slurry, including for micro-proppant slurries, even in the absence of gelling agents or dispersants normally relied on to maintain micro-proppants and other particulates in suspension. Additionally, the liquid concentrate proppant slurry compositions, disclosed herein, eliminates the need for remixing or recirculating the slurry since the particulates are well suspended within the slurry.

The liquid concentrate proppant slurry compositions, disclosed herein, can be delivered to a well-site, and diluted with the pad fluid stage during hydraulic fracturing operations. More specifically, the liquid concentrate proppant slurry compositions, disclosed herein, can be mixed with a fluid source and possibly other components, for example by pump and blender system 50 in FIG. 1, to form a combined fracturing fluid. The resulting combined fracturing fluid can be pumped down the wellbore under pressure to fracture treat the subterranean zone of interest in order to stimulate the production of hydrocarbons from the subterranean zone.

The presence of low-density particulates in the liquid concentrate proppant slurry has unexpectedly been found to improve the vertical distribution and longitudinal transport and coverage of the high-density proppant particulates in the complex fracture network. More specifically, the low-density suspension agent particulates enhances the suspension of the high-density proppant particulates, resulting in neutral buoyancy of the high-density proppant particulates in the combined fracturing fluid and improved transport of the high-density proppant particulates in the complex fracture network, including the both the near-wellbore and far-field regions. Additionally, the low-density particulates, including hollow glass microsphere particulates, have unexpectedly been found to facilitate fluid communication in secondary or dendritic fractures, in the far-field region, even under pressure conditions that exceed the crush strength of the low-density particulates. Accordingly, the presence of low-density particulates in the liquid concentrate proppant slurry may allow for fracturing treatments to access a greater portion of the formation.

In at least some instances, the neutral buoyancy and improved transport of the high-density proppant particulates results from attachment of the low-density particulates to the surface of the high-density proppant particulates. In such cases, attachment of the low-density particulates to the surfaces of high-density particulates, can cause the high-density particulates to become neutrally buoyant or suspended in the liquid concentrate proppant slurry and combined fracturing fluid, even without the use of a viscosifying agent.

The delivery of proppants to the wellsite in the form of a liquid concentrate proppant slurry is desirable in order to prevent the generation of silica dust that often occurs during the storage, transportation, and application of fine particulates or micro-proppant particulates for hydraulic fracturing treatments. The silica dust generated by non-slurried fine particulates and micro-proppant particulates is a major health issue for field personnel, potentially causing silicosis and other medical conditions.

The liquid concentrate proppant slurry can include a low concentration of tackifying agent that promotes the adhesion of the low-density particulates to the high-density particulates. The low-level of adhesion provided by the tackifying agent may also help to distribute the low-density particulates and the high-density particulates homogeneously within the liquid concentrate proppant slurry. According to the present disclosure, the tackifying agent may be present in the liquid concentrate proppant slurry in sufficient concentration to cause the high-density particulates to be neutrally buoyant or suspended in the fracturing fluid. Suitable tackifying agents may include, but are not limited to, non-aqueous tackifying agents, aqueous tackifying agents, silyl-modified polyamide, zeta potential modifying agents, the reaction product of an amine and a phosphate ester, any derivative thereof, and any combination thereof.

According to at least one aspect of the present disclosure, the low-density particulates may be caused to attach to the high-density particulates as a result of a coating on the high-density particulates that exhibits an affinity for the low-density particulates. In other cases, the low-density particulates may attach to the high-density particulates as a result of electrostatic attractions or interactions between the low-density particulates and the high-density particulates.

According to at least one aspect of the present disclosure, the low-density particulates are present in the liquid concentrate proppant slurry in sufficient concentration to cause the high-density particulates to be neutrally buoyant in the liquid concentrate proppant slurry.

According to at least one aspect of the present disclosure, the liquid concentrate proppant slurry contains a sufficient number of low-density suspension agent particulates to cause the high-density particulates to be neutrally buoyant in the liquid concentrate proppant slurry. In some cases, the ratio of low-density particulates to high-density particulates in the liquid concentrate proppant slurry is between about 0.1:1 and about 10:1, by weight. In other cases, the ratio of low-density particulates to high-density particulates in the liquid concentrate proppant slurry is between about 1:3 and about 3:1, by weight.

According to at least one aspect of the present disclosure, the concentration of solids in the liquid concentrate proppant slurry is between about 5 pounds per gallon and about 20 pounds per gallon. In other cases, the concentration of solids in the liquid concentrate proppant slurry is between about 7 pounds per gallon and about 15 pounds per gallon.

According to at least one aspect of the present disclosure, the liquid concentrate proppant slurry may further include a xanthan gel. In some cases, the xanthan gel may be present in the liquid concentrate proppant slurry in a concentration of between about 5 pounds per million gallons and about 30 pounds per million gallons.

The liquid concentrate proppant slurry may further include the friction reducing polymers as previously described. The liquid concentrate proppant slurry may further include a biocide.

According to the present disclosure, a method of preparing a fracturing fluid for use in fracturing a subterranean formation is disclosed. The method includes mixing the liquid concentrate proppant slurry, disclosed herein, with an aqueous-based fluid to formulate a fracturing fluid and introducing the fracturing fluid into a subterranean formation. In at least one aspect of the present disclosure, the mixing included in the method can occur at or near the wellsite. The aqueous-based fluid included in the method may consist of freshwater, saltwater, seawater, brine, or any combination thereof. Preparing the fracturing fluid, according to the disclosed method, may include either batch mixing or continuous mixing. In at least one aspect of the present disclosure, the liquid concentrate proppant slurry is mixed with the aqueous-based fluid in a ratio of 0.1 pounds liquid concentrate proppant slurry per 1 gallon of aqueous-based fluid. In other aspects of the present disclosure, the liquid concentrate proppant slurry is mixed with the aqueous-based fluid in a ratio of between about 0.05 and about 5 pounds liquid concentrate proppant slurry per 1 gallon of aqueous-based fluid.

According to the present disclosure, a method of fracturing a subterranean formation that includes mixing the liquid concentrate proppant slurry, disclosed herein, with an aqueous-based fluid to formulate a fracturing fluid and introducing the fracturing fluid into a subterranean formation, is provided. In at least one aspect of the present disclosure, the mixing included in the method can occur at or near the wellsite. The aqueous-based fluid included in the method may consist of freshwater, saltwater, seawater, brine, or any combination thereof. Preparing the fracturing fluid, according to the disclosed method, may include either batch mixing or continuous mixing. In at least one aspect of the present disclosure, the liquid concentrate proppant slurry is mixed with the aqueous-based fluid in a ratio of 0.1 pounds liquid concentrate proppant slurry per 1 gallon of aqueous-based fluid. In other aspects of the present disclosure, the liquid concentrate proppant slurry is mixed with the aqueous-based fluid in a ratio of between about 0.05 and about 5 pounds liquid concentrate proppant slurry per 1 gallon of aqueous-based fluid.

According to the present disclosure, a method of preparing a liquid concentrate proppant slurry is provided. The method includes providing an aqueous-based carrier fluid and adding low-density particulates, high-density particulates, and tackifying agent to the carrier fluid, wherein the low-density particulates and tackifying agent are added to the carrier fluid in sufficient concentration to cause the high-density particulates to be neutrally buoyant in the carrier fluid.

According to at least one aspect of the present disclosure, the method of preparing a liquid concentrate proppant slurry may be carried out by: providing and stirring an aqueous-based carrier fluid; adding low-density microspheres to the carrier fluid while mixing; adding high-density ceramic micro-proppant particulates to the microsphere slurry while mixing; and adding a tackifying agent to the particulate slurry while mixing (e.g., wet coating) to form a homogeneous and neutrally buoyant slurry of particulates.

In order to facilitate a better understanding of the present disclosure, the following examples of certain aspects of some embodiments are provided. In no way should the following examples be read to limit, or define, the entire scope of the present disclosure.

EXAMPLE 1

A liquid concentrate proppant slurry was prepared by first preparing an aqueous-based fluid containing 3% KCl and 20 pounds per million gallons of WG-37 xanthan gel. While stirring, low-density microspheres (3M Glass Bubbles HGS18000) were added to the aqueous fluid to obtain a concentration of 3 pounds of microspheres per gallon of the aqueous fluid. Again, while stirring, ceramic micro-proppant was added to the particulate slurry to obtain a concentration of 9 pounds of ceramic microproppant particulates per gallon of the aqueous fluid. Finally, tackifying agent SandWedge ABC was added to the particulate slurry, while stirring, in an amount of 5 gallons per 1,000 gallons to form a homogeneous mixture. Visual inspection of the prepared liquid concentrate proppant slurry indicated that the low-density and high-density particulates remained in homogeneous suspension for at least seven days following preparation.

EXAMPLE 2

A liquid concentrate proppant slurry was prepared by first preparing an aqueous-based fluid containing 3% KCl and 20 pounds per million gallons of WG-37 xanthan gel. While stirring, a 1:3 ratio (in pounds per gallon) of low-density microspheres (3M Glass Bubbles HGS5000) to micro-proppant were added to the aqueous fluid. After ensuring pour ability of the mixture an additional 1:3 ratio of HGS-5000 to micro-proppant was again added. The final concentrations of HGS-5000 low-density microspheres and micro-proppant were 2 pounds per gallon and 6 pounds per gallon, respectively. Finally, SandWedge ABC tackifying agent was added to the particulate slurry, in a concentration of 1 gallon per 1,000 gallons of the aqueous fluid, while stirring, to form a homogeneous mixture. Visual inspection of the prepared liquid concentrate proppant slurry indicated that the low-density and high-density particulates remained in homogeneous suspension for at least five days following preparation.

According to the present disclosure, a method of preparing a fracturing fluid for use in fracturing a subterranean formation is provided. The method includes mixing, using mixing equipment, to form a combined fracturing fluid: a first concentrated liquid slurry comprising low-density particulates; a second concentrated liquid slurry comprising high-density particulates; an aqueous-based liquid comprising a tackifying agent; and an aqueous-based fluid comprising freshwater, saltwater, seawater, brine, or a combination thereof, wherein the low-density particulates and tackifying agent are present in the combined fracturing fluid in sufficient concentration to cause the high-density particulates to be neutrally buoyant in the combined fracturing fluid. Preparing the fracturing fluid, according to the disclosed method, may include either batch mixing or continuous mixing.

Statements of the Disclosure Include:

Statement 1: A fracturing fluid comprising: an aqueous-based carrier fluid; high-density proppant particulates; and low-density suspension agent particulates.

Statement 2: A fracturing fluid according to Statement 1, wherein the low-density suspension agent particulates are present in the fracturing fluid in sufficient concentration to cause the high-density proppant particulates to be neutrally buoyant in the fracturing fluid.

Statement 3: A fracturing fluid according to Statement 1 or Statement 2, wherein a sufficient number of low-density suspension agent particulates are attached to the high-density proppant particulates to cause the high-density proppant particulates to be neutrally buoyant in the fracturing fluid.

Statement 4: A fracturing fluid according to any one of the preceding Statements 1-3, wherein the ratio of low-density suspension agent particulates to high-density proppant particulates in the fracturing fluid is between about 0.1:1 and about 10:1 by weight.

Statement 5: A fracturing fluid according to any one of the preceding Statements 1-4, wherein the ratio of low-density suspension agent particulates to high-density proppant particulates in the fracturing fluid is between about 1:3 and about 3:1 by weight.

Statement 6: A fracturing fluid according to Statement 3, wherein the low-density suspension agent particulates are attached to the high-density proppant particulates as a result of one selected from the group consisting of a coating on the high-density particulates, electrostatic attractions between the high-density particulates and the low-density particulates, a tackifying agent, and any combination thereof.

Statement 7: A fracturing fluid according to any one of the preceding Statements 1-6, further comprising a tackifying agent, wherein the tackifying agent is present in the fracturing fluid in sufficient concentration to cause the high-density proppant particulates to be neutrally buoyant in the fracturing fluid.

Statement 8: A fracturing fluid according to any one of the preceding Statements 1-7, wherein the median particle size of the high-density proppant particulates is between about 25 µm and about 110 µm.

Statement 9: A fracturing fluid according to any one of the preceding Statements 1-8, wherein the average density of the high-density proppant particulates is between about 2.0 grams per cubic centimeter and about 3.0 grams per cubic centimeter.

Statement 10: A fracturing fluid according to any one of the preceding Statements 1-8, wherein the average density of the high-density proppant particulates is at least 2.6 grams per cubic centimeter.

Statement 11: A fracturing fluid according to any one of the preceding Statements 1-8, wherein the average density of the high-density proppant particulates is at least 2.4 grams per cubic centimeter.

Statement 12: A fracturing fluid according to any one of the preceding Statements 1-8, wherein the average density of the high-density proppant particulates is between about 2.3 grams per cubic centimeter and about 2.7 grams per cubic centimeter.

Statement 13: A fracturing fluid according to any one of the preceding Statements 1-12, wherein the high-density proppant particulates and the low-density suspension agent particulates each individually comprise at least one material selected from the group consisting of sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, silica, alumina, fumed carbon, carbon black, graphite, mica, titanium dioxide, meta-silicate, calcium silicate, kaolin, talc, zirconia, boron, fly ash, hollow glass microspheres, ceramic microspheres, solid glass, and any combination thereof.

Statement 14: A fracturing fluid according to any one of the preceding Statements 1-13, wherein the high-density proppant particulates and low-density suspension agent particulates are each micro-proppants.

Statement 15: A fracturing fluid according to any one of the preceding Statements 1-14, wherein the high-density proppant particulates comprise ceramic micro-proppants.

Statement 16: A fracturing fluid according to any one of the preceding Statements 1-15, wherein the high-density proppant particulates comprise ceramic microspheres.

Statement 17: A fracturing fluid according to any one of the preceding Statements 1-16, wherein the high-density proppant particulates comprise Zeeospheres N-1000, Zeeospheres N-1200, or a combination of Zeeospheres N-1000 and Zeeospheres N-1200.

Statement 18: A fracturing fluid according to any one of the preceding Statements 1-17, wherein the median particle size of the low-density suspension agent particulates is between about 10 µm and about 60 µm.

Statement 19: A fracturing fluid according to any one of the preceding Statements 1-18, wherein the average density of the low-density suspension agent particulates is between about 0.37 grams per cubic centimeter and about 0.63 grams per cubic centimeter.

Statement 20: A fracturing fluid according to any one of the preceding Statements 1-18, wherein the average density of the low-density suspension agent particulates is less than about 1.00 grams per cubic centimeter.

Statement 21: A fracturing fluid according to any one of the preceding Statements 1-18, wherein the average density of the low-density suspension agent particulates is less than about 0.85 grams per cubic centimeter.

Statement 22: A fracturing fluid according to any one of the preceding Statements 1-18, wherein the average density of the low-density suspension agent particulates is less than about 0.75 grams per cubic centimeter.

Statement 23: A fracturing fluid according to any one of the preceding Statements 1-22, wherein the crush strength of the low-density suspension agent particulates is between about 4,000 psi and about 18,000 psi.

Statement 24: A fracturing fluid according to any one of the preceding Statements 1-23, wherein the low-density suspension agent particulates comprise a coating that increases the crush strength of the low-density suspension agent particulates.

Statement 25: A fracturing fluid according to any one of the preceding Statements 1-24, wherein the low-density suspension agent particulates comprise hollow glass particulates or hollow mineral oxide particulates.

Statement 26: A fracturing fluid according to any one of the preceding Statements 1-25, wherein the low-density suspension agent particulates comprise hollow glass microspheres.

Statement 27: A fracturing fluid according to any one of the preceding Statements 1-26, wherein the low-density suspension agent particulates comprise one selected from the group consisting of 3M Glass Bubbles HGS2000, HGS3000, HGS4000, HGS5000, HGS6000, HGS8000X, HGS10000, HGS18000, HGS19000, and any combination thereof.

Statement 28: A fracturing fluid according to any one of the preceding Statements 1-27, further comprising a xanthan gel.

Statement 29: A fracturing fluid according to any one of the preceding Statements 1-28, further comprising a friction reducing polymer comprising at least one monomeric unit selected from the group consisting of acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, a methacrylic acid, an acrylic acid ester, a methacrylic acid ester, and any combination thereof.

Statement 30: A fracturing fluid according to Statement 6 or Statement 7, wherein the tackifying agent is selected from the group consisting of a non-aqueous tackifying agent, an aqueous tackifying agent, a silyl-modified polyamide, a zeta potential modifying agent, a reaction product of an amine and a phosphate ester, any derivative thereof, and any combination thereof.

Statement 31: A method of fracturing a subterranean formation comprising introducing into a subterranean formation a fracturing fluid using one or more pumps according to any of the preceding Statements 1-30.

Statement 32: A liquid concentrate proppant slurry comprising: an aqueous-based carrier fluid; high-density particulates; and low-density particulates, wherein the low-density particulates are present in the liquid concentrate proppant slurry in sufficient concentration to cause the high-density particulates to be neutrally buoyant in the liquid concentrate proppant slurry.

Statement 33: A liquid concentrate proppant slurry according to Statement 32, wherein a sufficient number of low-density particulates are attached to the high-density particulates to cause the high-density particulates to be neutrally buoyant in the liquid concentrate proppant slurry.

Statement 34: A liquid concentrate proppant slurry according to Statement 32 or Statement 33, wherein the ratio of low-density particulates to high-density particulates in the liquid concentrate proppant slurry is between about 0.1:1 and about 10:1 by weight.

Statement 35: A liquid concentrate proppant slurry according to any one of the preceding Statements 32-34, wherein the ratio of low-density particulates to high-density particulates in the liquid concentrate proppant slurry is between about 1:3 and about 3:1 by weight.

Statement 36: A liquid concentrate proppant slurry according to any one of the preceding Statements 32-35, wherein the low-density particulates are attached to the high-density particulates as a result of one selected from the group consisting of a coating on the high-density particulates, electrostatic attractions between the high-density particulates and the low-density particulates, a tackifying agent, and any combination thereof.

Statement 37: A liquid concentrate proppant slurry according to any one of the preceding Statements 32-36, further comprising a tackifying agent, wherein the tackifying agent is present in the liquid concentrate proppant slurry in sufficient concentration to cause the high-density particulates to be neutrally buoyant in the liquid concentrate proppant slurry.

Statement 38: A liquid concentrate proppant slurry according to Statement 36 or Statement 37, wherein the tackifying agent is selected from the group consisting of a non-aqueous tackifying agent, an aqueous tackifying agent, a silyl-modified polyamide, a zeta potential modifying agent, a reaction product of an amine and a phosphate ester, any derivative thereof, and any combination thereof.

Statement 39: A liquid concentrate proppant slurry according to any one of the preceding Statements 32-38, wherein the median particle size of the high-density particulates is between about 25 µm and about 110 µm.

Statement 40: A liquid concentrate proppant slurry according to any one of the preceding Statements 32-39, wherein the average density of the high-density particulates is between about 2.0 grams per cubic centimeter and about 3.0 grams per cubic centimeter.

Statement 41: A liquid concentrate proppant slurry according to any one of the preceding Statements 32-39, wherein the average density of the high-density particulates is at least 2.6 grams per cubic centimeter.

Statement 42: A liquid concentrate proppant slurry according to any one of the preceding Statements 32-39, wherein the average density of the high-density particulates is at least 2.4 grams per cubic centimeter.

Statement 43: A liquid concentrate proppant slurry according to any one of the preceding Statements 32-39, wherein the average density of the high-density particulates is between about 2.3 grams per cubic centimeter and about 2.7 grams per cubic centimeter.

Statement 44: A liquid concentrate proppant slurry according to any one of the preceding Statements 32-43, wherein the high-density particulates and the low-density particulates each individually comprise at least one material selected from the group consisting of sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, silica, alumina, fumed carbon, carbon black, graphite, mica, titanium dioxide, meta-silicate, calcium silicate, kaolin, talc, zirconia, boron, fly ash, hollow glass microspheres, ceramic microspheres, solid glass, and any combination thereof.

Statement 45: A liquid concentrate proppant slurry according to any one of the preceding Statements 32-44, wherein the high-density particulates comprise ceramic micro-proppants.

Statement 46: A liquid concentrate proppant slurry according to any one of the preceding Statements 32-45, wherein the high-density particulates comprise ceramic microspheres.

Statement 47: A liquid concentrate proppant slurry according to any one of the preceding Statements 32-46, wherein the high-density particulates comprise Zeeospheres N-1000, Zeeospheres N-1200, or a combination of Zeeospheres N-1000 and Zeeospheres N-1200.

Statement 48: A liquid concentrate proppant slurry according to any one of the preceding Statements 32-47, wherein the median particle size of the low-density particulates is between about 10 μm and about 60 μm.

Statement 49: A liquid concentrate proppant slurry according to any one of the preceding Statements 32-48, wherein the average density of the low-density particulates is less than about 1.00 grams per cubic centimeter.

Statement 50: A liquid concentrate proppant slurry according to any one of the preceding Statements 32-48, wherein the average density of the low-density particulates is less than about 0.85 grams per cubic centimeter.

Statement 51: A liquid concentrate proppant slurry according to any one of the preceding Statements 32-48, wherein the average density of the low-density suspension agent particulates is less than about 0.75 grams per cubic centimeter.

Statement 52: A liquid concentrate proppant slurry according to any one of the preceding Statements 32-48, wherein the density of the low-density particulates is between about 0.37 grams per cubic centimeter and about 0.63 grams per cubic centimeter.

Statement 53: A liquid concentrate proppant slurry according to any one of the preceding Statements 32-52, wherein the crush strength of the low-density particulates is between about 4,000 psi and about 18,000 psi.

Statement 54: A liquid concentrate proppant slurry according to any one of the preceding Statements 32-53, wherein the low-density particulates comprise a coating that increases the crush strength of the low-density suspension agent particulates.

Statement 55: A liquid concentrate proppant slurry according to any one of the preceding Statements 32-54, wherein the low-density particulates comprise hollow glass particulates or hollow mineral oxide particulates.

Statement 56: A liquid concentrate proppant slurry according to any one of the preceding Statements 32-55, wherein the low-density particulates comprise hollow glass microspheres.

Statement 57: A liquid concentrate proppant slurry according to any one of the preceding Statements 32-56, wherein the low-density particulates comprise one selected from the group consisting of 3M Glass Bubbles HGS2000, HGS3000, HGS4000, HGS5000, HGS6000, HGS8000X, HGS10000, HGS18000, HGS19000, and any combination thereof.

Statement 58: A liquid concentrate proppant slurry according to any one of the preceding Statements 32-57, further comprising xanthan gel, wherein the xanthan gel is present in the liquid concentrate proppant slurry in a concentration of between about 5 pounds per million gallons and about 30 pounds per million gallons.

Statement 59: A liquid concentrate proppant slurry according to any one of the preceding Statements 32-58, further comprising a friction reducing polymer comprising at least one monomeric unit selected from the group consisting of acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, a methacrylic acid, an acrylic acid ester, a methacrylic acid ester, and any combination thereof.

Statement 60: A liquid concentrate proppant slurry according to any one of the preceding Statements 32-59, wherein the concentration of solids in the liquid concentrate proppant slurry is between about 5 pounds per gallon and about 20 pounds per gallon.

Statement 61: A liquid concentrate proppant slurry according to any one of the preceding Statements 32-60, wherein the concentration of solids in the liquid concentrate proppant slurry is between about 7 pounds per gallon and about 15 pounds per gallon.

Statement 62: A liquid concentrate proppant slurry according to any of the preceding Statements 32-61, wherein the high-density particulates and low-density particulates are each micro-proppants.

Statement 63: A method of fracturing a subterranean formation, the method comprising: mixing, using mixing equipment, a liquid concentrate proppant slurry according to any one of the preceding Statements 32-62 with an aqueous-based fluid to formulate a fracturing fluid; and introducing the fracturing fluid into a subterranean formation.

Statement 64: A method of preparing a fracturing fluid for use in fracturing a subterranean formation according to Statement 63, wherein the mixing occurs at or near the wellsite.

Statement 65: A method of preparing a fracturing fluid for use in fracturing a subterranean formation according to Statement 63 or Statement 64, wherein the aqueous-based fluid comprises at least one selected from the group consisting of freshwater, saltwater, seawater, brine, or a combination thereof.

Statement 66: A method of preparing a fracturing fluid for use in fracturing a subterranean formation according to any one of the preceding Statements 63-65, wherein the mixing comprises batch mixing or continuous mixing.

Statement 67: A method of preparing a fracturing fluid for use in fracturing a subterranean formation according to any one of the preceding Statements 63-66, wherein the liquid concentrate proppant slurry is mixed with the aqueous-based fluid in a ratio of about 0.1 pounds liquid concentrate proppant slurry per about 1 gallon of aqueous-based fluid.

Statement 68: A method of preparing a fracturing fluid for use in fracturing a subterranean formation according to any one of the preceding Statements 63-66, wherein the liquid concentrate proppant slurry is mixed with the aqueous-based fluid in a ratio of between about 0.05 and about 5 pounds liquid concentrate proppant slurry per about 1 gallon of aqueous-based fluid.

Statement 69: A method of fracturing a subterranean formation comprising: mixing a liquid concentrate proppant slurry according to any one of the preceding Statements 32-62 with an aqueous-based fluid to formulate a fracturing fluid; and introducing the fracturing fluid into a subterranean formation.

Statement 70: A method of preparing a fracturing fluid for use in fracturing a subterranean formation according to Statement 69, wherein the mixing occurs at or near the wellsite.

Statement 71: A method of preparing a fracturing fluid for use in fracturing a subterranean formation according to Statement 69 or Statement 70, wherein the aqueous-based fluid comprises at least one selected from the group consisting of freshwater, saltwater, seawater, brine, or a combination thereof.

Statement 72: A method of preparing a fracturing fluid for use in fracturing a subterranean formation according to any one of the preceding Statements 69-71, wherein the mixing comprises batch mixing or continuous mixing.

Statement 73: A method of preparing a fracturing fluid for use in fracturing a subterranean formation according to any one of the preceding Statements 69-72, wherein the liquid concentrate proppant slurry is mixed with the aqueous-based fluid in a ratio of about 0.1 pounds liquid concentrate proppant slurry per about 1 gallon of aqueous-based fluid.

Statement 74: A method of preparing a fracturing fluid for use in fracturing a subterranean formation according to any one of the preceding Statements 69-72, wherein the liquid concentrate proppant slurry is mixed with the aqueous-based fluid in a ratio of between about 0.05 and about 5 pounds liquid concentrate proppant slurry per about 1 gallon of aqueous-based fluid.

Statement 75: A method of preparing a liquid concentrate proppant slurry comprising: providing an aqueous-based carrier fluid; adding low-density particulates, high-density particulates, and tackifying agent to the carrier fluid, wherein the low-density particulates and tackifying agent are added to the carrier fluid in sufficient concentration to cause the high-density particulates to be neutrally buoyant in the carrier fluid.

Statement 76: A method of preparing a liquid concentrate proppant slurry according to Statement 75, wherein the low-density particulates and the high-density particulates are added to the carrier fluid such that the ratio of low-density particulates to high-density particulates in the carrier fluid is between about 0.1:1 and about 10:1 by weight.

Statement 77: A method of preparing a liquid concentrate proppant slurry according to Statement 75 or Statement 76, wherein the low-density particulates and the high-density particulates are added to the carrier fluid such that the ratio of low-density particulates to high-density particulates in the carrier fluid is between about 1:3 and about 3:1 by weight.

Statement 78: A method of preparing a liquid concentrate proppant slurry according to any one of the preceding Statements 75-77, wherein the tackifying agent is selected from the group consisting of a non-aqueous tackifying agent, an aqueous tackifying agent, a silyl-modified polyamide, a zeta potential modifying agent, a reaction product of an amine and a phosphate ester, any derivative thereof, and any combination thereof.

Statement 79: A method of preparing a liquid concentrate proppant slurry according to any one of the preceding Statements 75-78, wherein the median particle size of the high-density particulates is between about 25 μm and about 110 μm.

Statement 80: A method of preparing a liquid concentrate proppant slurry according to any one of the preceding Statements 75-79, wherein the average density of the high-density particulates is between about 2.0 grams per cubic centimeter and about 3.0 grams per cubic centimeter.

Statement 81: A method of preparing a liquid concentrate proppant slurry according to any one of the preceding Statements 75-80, wherein the average density of the high-density particulates is at least 2.6 grams per cubic centimeter.

Statement 82: A method of preparing a liquid concentrate proppant slurry according to any one of the preceding Statements 75-80, wherein the average density of the high-density particulates is at least 2.4 grams per cubic centimeter.

Statement 83: A method of preparing a liquid concentrate proppant slurry according to any one of the preceding Statements 75-80, wherein the average density of the high-density particulates is between about 2.3 grams per cubic centimeter and about 2.7 grams per cubic centimeter.

Statement 84: A method of preparing a liquid concentrate proppant slurry according to any one of the preceding Statements 75-83, wherein the high-density particulates and the low-density particulates each individually comprise at least one material selected from the group consisting of sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, silica, alumina, fumed carbon, carbon black, graphite, mica, titanium dioxide, meta-silicate, calcium silicate, kaolin, talc, zirconia, boron, fly ash, hollow glass microspheres, ceramic microspheres, solid glass, and any combination thereof.

Statement 85: A method of preparing a liquid concentrate proppant slurry according to any one of the preceding Statements 75-84, wherein the high-density particulates and low-density particulates are each micro-proppants.

Statement 86: A method of preparing a liquid concentrate proppant slurry according to any one of the preceding Statements 75-85, wherein the high-density particulates comprise ceramic micro-proppants.

Statement 87: A method of preparing a liquid concentrate proppant slurry according to any one of the preceding Statements 75-86, wherein the high-density particulates comprise ceramic microspheres.

Statement 88: A method of preparing a liquid concentrate proppant slurry according to any one of the preceding Statements 75-87, wherein the high-density particulates comprise Zeeospheres N-1000, Zeeospheres N-1200, or a combination of Zeeospheres N-1000 and Zeeospheres N-1200.

Statement 89: A method of preparing a liquid concentrate proppant slurry according to any one of the preceding Statements 75-88, wherein the median particle size of the low-density particulates is between about 10 μm and about 60 μm.

Statement 90: A method of preparing a liquid concentrate proppant slurry according to any one of the preceding Statements 75-89, wherein the average density of the low-density particulates is between about 0.37 grams per cubic centimeter and about 0.63 grams per cubic centimeter.

Statement 91: A method of preparing a liquid concentrate proppant slurry according to any one of the preceding Statements 75-89, wherein the average density of the low-density particulates is less than about 1.00 grams per cubic centimeter.

Statement 92: A method of preparing a liquid concentrate proppant slurry according to any one of the preceding Statements 75-89, wherein the average density of the low-density particulates is less than about 0.85 grams per cubic centimeter.

Statement 93: A method of preparing a liquid concentrate proppant slurry according to any one of the preceding Statements 75-89, wherein the average density of the low-density suspension agent particulates is less than about 0.75 grams per cubic centimeter.

Statement 94: A method of preparing a liquid concentrate proppant slurry according to any one of the preceding Statements 75-93, wherein the crush strength of the low-density particulates is between about 4,000 psi and about 18,000 psi.

Statement 95: A method of preparing a liquid concentrate proppant slurry according to any one of the preceding Statements 75-94, wherein the low-density particulates comprise a coating that increases the crush strength of the low-density suspension agent particulates.

Statement 96: A method of preparing a liquid concentrate proppant slurry according to any one of the preceding Statements 75-95, wherein the low-density particulates comprise hollow glass particulates or hollow mineral oxide particulates.

Statement 97: A method of preparing a liquid concentrate proppant slurry according to any one of the preceding Statements 75-96, wherein the low-density particulates comprise hollow glass microspheres.

Statement 98: A method of preparing a liquid concentrate proppant slurry according to any one of the preceding Statements 75-97, wherein the low-density particulates comprise one selected from the group consisting of 3M Glass Bubbles HGS2000, HGS3000, HGS4000, HGS5000, HGS6000, HGS8000X, HGS10000, HGS18000, HGS19000, and any combination thereof.

Statement 99: A method of preparing a liquid concentrate proppant slurry according to any one of the preceding Statements 75-98, further comprising adding xanthan gel to the carrier fluid, such that the xanthan gel is present in the carrier fluid in a concentration of between about 5 pounds per million gallons and about 30 pounds per million gallons.

Statement 100: A method of preparing a liquid concentrate proppant slurry according to any one of the preceding Statements 75-99, further comprising adding a friction reducing polymer to the carrier fluid, wherein the friction reducing polymer comprises at least one monomeric unit selected from the group consisting of acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, a methacrylic acid, an acrylic acid ester, a methacrylic acid ester, and any combination thereof.

Statement 101: A method of preparing a liquid concentrate proppant slurry according to any one of the preceding Statements 75-100, wherein the low-density particulates and high-density particulates are added to the carrier fluid such that the concentration of solids in the liquid concentrate proppant slurry is between about 5 pounds per gallon and about 20 pounds per gallon.

Statement 102: A method of preparing a liquid concentrate proppant slurry according to any one of the preceding Statements 75-101, wherein the low-density particulates and high-density particulates are added to the carrier fluid such that the concentration of solids in the liquid concentrate proppant slurry is between about 7 pounds per gallon and about 15 pounds per gallon.

Statement 103: A method of preparing a fracturing fluid for use in fracturing a subterranean formation comprising: mixing, using mixing equipment, to form a combined fracturing fluid: a first concentrated liquid slurry comprising low-density particulates; a second concentrated liquid slurry comprising high-density particulates; an aqueous-based liquid comprising a tackifying agent; and an aqueous-based fluid comprising freshwater, saltwater, seawater, brine, or a combination thereof, wherein the low-density particulates and tackifying agent are present in the combined fracturing fluid in sufficient concentration to cause the high-density particulates to be neutrally buoyant in the combined fracturing fluid.

Statement 104: A method of preparing a fracturing fluid for use in fracturing a subterranean formation according to Statement 103, wherein the ratio of low-density particulates to high-density particulates in the combined fracturing fluid is between about 0.1:1 and about 10:1 by weight.

Statement 105: A method of preparing a fracturing fluid for use in fracturing a subterranean formation according to Statement 103 or Statement 104, wherein the ratio of low-density particulates to high-density particulates in the combined fracturing fluid is between about 1:3 and about 3:1 by weight.

Statement 106: A method of preparing a fracturing fluid for use in fracturing a subterranean formation according to any one of the preceding Statements 103-105, wherein the median particle size of the high-density particulates is between about 25 μm and about 110 μm.

Statement 107: A method of preparing a fracturing fluid for use in fracturing a subterranean formation according to any one of the preceding Statements 103-106, wherein the average density of the high-density particulates is between about 2.0 grams per cubic centimeter and about 3.0 grams per cubic centimeter.

Statement 108: A method of preparing a fracturing fluid for use in fracturing a subterranean formation according to any one of the preceding Statements 103-107, wherein the average density of the high-density particulates is at least 2.6 grams per cubic centimeter.

Statement 109: A method of preparing a fracturing fluid for use in fracturing a subterranean formation according to any one of the preceding Statements 103-107, wherein the average density of the high-density particulates is at least 2.4 grams per cubic centimeter.

Statement 110: A method of preparing a fracturing fluid for use in fracturing a subterranean formation according to any one of the preceding Statements 103-107, wherein the average density of the high-density particulates is between about 2.3 grams per cubic centimeter and about 2.7 grams per cubic centimeter.

Statement 111: A method of preparing a fracturing fluid for use in fracturing a subterranean formation according to any one of the preceding Statements 103-110, wherein the high-density particulates and the low-density particulates each individually comprise at least one material selected from the group consisting of sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, silica, alumina, fumed carbon, carbon black, graphite, mica, titanium dioxide, meta-silicate, calcium silicate, kaolin, talc, zirconia, boron, fly ash, hollow glass microspheres, ceramic microspheres, solid glass, and any combination thereof.

Statement 112: A method of preparing a fracturing fluid for use in fracturing a subterranean formation according to any one of the preceding Statements 103-111, wherein the high-density particulates and low-density particulates are each micro-proppants.

Statement 113: A method of preparing a fracturing fluid for use in fracturing a subterranean formation according to any one of the preceding Statements 103-112, wherein the high-density particulates comprise ceramic micro-proppants.

Statement 114: A method of preparing a fracturing fluid for use in fracturing a subterranean formation according to any one of the preceding Statements 103-112, wherein the high-density particulates comprise ceramic microspheres.

Statement 115: A method of preparing a fracturing fluid for use in fracturing a subterranean formation according to any one of the preceding Statements 103-114, wherein the high-density particulates comprise Zeeospheres N-1000, Zeeospheres N-1200, or a combination of Zeeospheres N-1000 and Zeeospheres N-1200.

Statement 116: A method of preparing a fracturing fluid for use in fracturing a subterranean formation according to any one of the preceding Statements 103-115, wherein the median particle size of the low-density particulates is between about 10 μm and about 60 μm.

Statement 117: A method of preparing a fracturing fluid for use in fracturing a subterranean formation according to any one of the preceding Statements 103-116, wherein the average density of the low-density particulates is between about 0.37 grams per cubic centimeter and about 0.63 grams per cubic centimeter.

Statement 118: A method of preparing a fracturing fluid for use in fracturing a subterranean formation according to any one of the preceding Statements 103-117, wherein the average density of the low-density particulates is less than about 1.00 grams per cubic centimeter.

Statement 119: A method of preparing a fracturing fluid for use in fracturing a subterranean formation according to any one of the preceding Statements 103-117, wherein the average density of the low-density particulates is less than about 0.85 grams per cubic centimeter.

Statement 120: A method of preparing a fracturing fluid for use in fracturing a subterranean formation according to any one of the preceding Statements 103-117, wherein the average density of the low-density suspension agent particulates is less than about 0.75 grams per cubic centimeter.

Statement 121: A method of preparing a fracturing fluid for use in fracturing a subterranean formation according to any one of the preceding Statements 103-120, wherein the crush strength of the low-density particulates is between about 4,000 psi and about 18,000 psi.

Statement 122: A method of preparing a fracturing fluid for use in fracturing a subterranean formation according to any one of the preceding Statements 103-121, wherein the low-density particulates comprise a coating that increases the crush strength of the low-density suspension agent particulates.

Statement 123: A method of preparing a fracturing fluid for use in fracturing a subterranean formation according to any one of the preceding Statements 103-122, wherein the low-density particulates comprise hollow glass particulates or hollow mineral oxide particulates.

Statement 124: A method of preparing a fracturing fluid for use in fracturing a subterranean formation according to any one of the preceding Statements 103-123, wherein the low-density particulates comprise hollow glass microspheres.

Statement 125: A method of preparing a fracturing fluid for use in fracturing a subterranean formation according to any one of the preceding Statements 103-124, wherein the low-density particulates comprise one selected from the group consisting of 3M Glass Bubbles HGS2000, HGS3000, HGS4000, HGS5000, HGS6000, HGS8000X, HGS10000, HGS18000, HGS19000, and any combination thereof.

Statement 126: A method of preparing a fracturing fluid for use in fracturing a subterranean formation according to any one of the preceding Statements 103-125, wherein the tackifying agent is selected from the group consisting of a non-aqueous tackifying agent, an aqueous tackifying agent, a silyl-modified polyamide, a zeta potential modifying agent, a reaction product of an amine and a phosphate ester, any derivative thereof, and any combination thereof.

Statement 127: A method of preparing a fracturing fluid for use in fracturing a subterranean formation according to any one of the preceding Statements 103-126, wherein the mixing comprises batch mixing or continuous mixing.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that a system including either one member of the set, or multiple members of the set, or all members of the set, satisfies the claim.

We claim:

1. A liquid concentrate fracturing fluid slurry comprising:
an aqueous-based carrier fluid,
high-density microproppant particulates, the median particle size of the high-density microproppant particulates being between about 25 μm and about 110 μm and the average density of the high-density proppant particulates being at least 2.6 grams per cubic centimeter; and
low-density suspension agent particulates, the median particle size of the low-density suspension agent particulates is between about 10 μm and about 60 μm and the average density of the low-density suspension agent particulates is between about 0.37 grams per cubic centimeter and about 0.63 grams per cubic centimeter;
a tackifying agent, wherein the tackifying agent is present in the fracturing fluid in sufficient concentration to cause the high-density proppant particulates to be neutrally buoyant in the fracturing fluid,
wherein the high-density microproppant particulates and low-density suspension agent particulates are solids, and the concentration of solids in the slurry is between about 5 pounds per gallon and 20 pounds per gallon.

2. The liquid concentrate fracturing fluid slurry of claim 1, wherein the ratio of low-density suspension agent particulates to high-density proppant particulates in the fracturing fluid is between about 0.1:1 and about 10:1 by weight.

3. The liquid concentrate fracturing fluid slurry of claim 1, wherein the high-density proppant particulates and the low-density suspension agent particulates each individually comprise at least one material selected from the group consisting of sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, silica, alumina, fumed carbon, carbon black, graphite, mica, titanium dioxide, meta-silicate, calcium silicate, kaolin, talc, zirconia, boron, fly ash, hollow glass microspheres, ceramic microspheres, solid glass, and any combination thereof.

4. The liquid concentrate fracturing fluid slurry of claim 1, wherein the high-density proppant particulates comprise ceramic micro-proppants and the low-density suspension agent particulates comprise hollow glass microspheres.

5. The liquid concentrate fracturing fluid slurry of claim 1, further comprising a second aqueous-based fluid.

6. A method of preparing the liquid concentrate fracturing fluid slurry of claim 1, the method comprising:
mixing, using mixing equipment:
a first concentrated liquid slurry comprising the low-density particulates;
a second concentrated liquid slurry comprising the high-density microproppant particulates;
an aqueous-based liquid comprising the tackifying agent; and
an aqueous-based fluid comprising freshwater, saltwater, seawater, brine, or a combination thereof.

7. A method of fracturing a subterranean formation comprising introducing the liquid concentrate fracturing fluid slurry of claim 1 into a subterranean formation using one or more pumps.

8. A liquid concentrate proppant slurry comprising:
an aqueous-based carrier fluid;
high-density microproppant particulates, the median particle size of the high-density microproppant particulates being between about 25 μm and about 110 μm and the average density of the high-density proppant particulates being at least 2.6 grams per cubic centimeter; and
low-density particulates, the median particle size of the low-density suspension agent particulates is between about 10 μm and about 60 μm and the average density of the low-density suspension agent particulates is between about 0.37 grams per cubic centimeter and about 0.63 grams per cubic centimeter,
a tackifying agent, wherein the tackifying agent is present in the fracturing fluid in sufficient concentration to cause the high-density proppant particulates to be neutrally buoyant in the fracturing fluid,
wherein the high-density microproppant particulates and low-density suspension agent particulates are solids, and the concentration of solids in the slurry is between about 5 pounds per gallon and 20 pounds per gallon.

9. The liquid concentrate proppant slurry of claim 8, wherein the ratio of low-density particulates to high-density particulates in the liquid concentrate proppant slurry is between about 0.1:1 and about 10:1 by weight.

10. The liquid concentrate proppant slurry of claim 8, wherein the high-density particulates and the low-density particulates each individually comprise at least one material selected from the group consisting of sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, silica, alumina, fumed carbon, carbon black, graphite, mica, titanium dioxide, meta-silicate, calcium silicate, kaolin, talc, zirconia, boron, fly ash, hollow glass microspheres, ceramic microspheres, solid glass, and any combination thereof.

11. The liquid concentrate proppant slurry of claim 8, wherein the high-density particulates comprise ceramic micro-proppants and the low-density particulates comprise hollow glass microspheres.

12. A method of preparing the liquid concentrate proppant slurry of claim 8, the method comprising:
providing the aqueous-based carrier fluid; and
adding the low-density particulates, the high-density particulates, and the tackifying agent to the carrier fluid.

* * * * *